(12) United States Patent
Barker et al.

(10) Patent No.: US 7,264,013 B2
(45) Date of Patent: Sep. 4, 2007

(54) ENHANCED PURGE EFFECT IN GAS CONDUIT

(75) Inventors: Joseph Raymond Barker, New Tripoli, PA (US); Alexandre De Almeida Botelho, Macungie, PA (US); John Timothy Collins, Allentown, PA (US); Andrew Joseph Toth, New Tripoli, PA (US); Ronald Martin Pearlstein, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 172 days.

(21) Appl. No.: 11/128,515

(22) Filed: May 13, 2005

(65) Prior Publication Data

US 2006/0254645 A1    Nov. 16, 2006

(51) Int. Cl.
*G05D 7/00* (2006.01)
(52) U.S. Cl. ............ 137/15.04; 137/240; 134/166 C
(58) Field of Classification Search ............. 137/240, 137/15.04; 134/166 C
See application file for complete search history.

(56) References Cited

U.S. PATENT DOCUMENTS

| | | | |
|---|---|---|---|
| 4,169,486 A | * | 10/1979 | Otteman et al. ............ 137/240 |
| 4,383,547 A | * | 5/1983 | Lorenz et al. ............. 137/240 |
| 5,137,047 A | | 8/1992 | George |
| 5,359,787 A | | 11/1994 | Mostowy, Jr. et al. |
| 5,398,712 A | | 3/1995 | Wang et al. |
| 5,592,984 A | * | 1/1997 | Schmiedeknecht et al. ... 164/62 |
| 5,749,389 A | | 5/1998 | Ritrosi et al. |
| 6,050,287 A | | 4/2000 | Goshima et al. |
| 6,209,571 B1 | | 4/2001 | Itoh et al. |
| 6,264,246 B1 | | 7/2001 | Goshima et al. |

FOREIGN PATENT DOCUMENTS

| | | |
|---|---|---|
| EP | 0 382 985 A1 | 8/1990 |
| EP | 0 626 214 A1 | 11/1994 |
| EP | 0 651 189 A2 | 5/1995 |
| WO | WO86/06986 | 12/1986 |

* cited by examiner

*Primary Examiner*—Kevin Lee
(74) *Attorney, Agent, or Firm*—Lina Yang; Geoffrey L. Chase (57) ABSTRACT

The present invention provides a gas transfer apparatus designed for enhanced purging of a pigtail conduit and a process for effecting such purging. The apparatus comprises a surge chamber having a first end, a body and a second end, the first end in communication with the pigtail conduit. A body section of the surge chamber has a cross-section larger than the cross-section of the pigtail conduit. The second end is in communication with a vessel containing a gas source. The apparatus includes a purge gas source for delivery of a purge gas to the pigtail conduit whereby during an alternating cycle of pressurization of the pigtail conduit with the purge gas and depressurization, impurities can be removed from within the pigtail conduit.

17 Claims, 4 Drawing Sheets

ENHANCED PURGE EFFECT IN GAS CONDUIT

BACKGROUND OF THE INVENTION

It has become increasingly important in a number of various and diverse industries to have a source of high purity process gas. In the electronics industry, for example, reactive gases such as silane, arsine, diborane, phosphine, sulfur hexafluoride, hydrogen bromide, tungsten hexafluoride, and others are widely used in the semiconductor industry in the manufacture of integrated circuitry. The etching and deposition processes for new semiconductor designs often require extremely low levels of measurable contamination. Transfer lines have to be essentially free of contamination. Use of reactive gases that may be pyrophoric and extremely toxic present significant safety issues when changing the gas supply.

Delivery of the process gases to a point of use is made through gas transfer conduits comprised of valves and connections. These conduits are commonly connected to a source such as gas cylinder, tube trailer, etc. and to a point of use delivery site, e.g., a gas control manifold. Purging the gas transfer conduit of piping, tubing and valves, commonly called a pigtail, is a common practice. On the one hand, purging is effected before disconnection of the gas source to eliminate any gas remaining in the conduit that may be hazardous to the operator. And, after connection of the pigtail to the gas source, e.g., a gas cylinder, purging is effected for the purpose of removing contaminants, e.g., moisture and atmospheric gases now present in the pigtail. In the step of purging, the pigtail is pressurized and de-pressurized multiple times during the change-out of an empty high-purity gas cylinder, and its replacement.

As in change-out of gas sources for the electronic industry, other industries face similar issues. For example, purging of pigtail conduits employed in analytical apparatus is performed in those instances where one wishes to change out the carrier gases associated with the analytical process. Purging can be done in similar manner to that in the electronics industry.

At present, there are several basic techniques used in the industry to purge the pigtail connection such as that employed between a delivery site manifold and a replacement high purity gas cylinder. The most widely used dilution techniques for purging are known as "cross-purge" and "deep-purge".

Cross Purge Dilution purging is a succession of manifold pressurizations and depressurizations. The sources providing the pressurization and depressurization are mounted away from the connection to the gas source. Typically, the manifold and pigtail flow lines containing the process gas are vented to a low-pressure system maintained at or below atmospheric pressure. The control manifold is thereafter pressurized, typically to several atmospheres, with a purge gas, typically an inert gas such as nitrogen, and again vented to the low-pressure or vacuum system. Each successive application of venting and pressurizing constitutes a purge cycle. The procedure is repeated for a predetermined number of cycles over a period of time until the process gas concentration reaches a low level considered safe and clean for the semiconductor fabrication process.

Deep-purge has been widely practiced by introducing a purge gas at or near the cylinder valve connection. For example, a system may be provided for supplying purge gas to within about 2 inches of the cylinder valve outlet. Deep purge improves contaminant removal by eliminating the "dead volume" in the "pigtail" and particularly in the cylinder connection itself.

A current method of implementing the "cross-purge" and "deep-purge" techniques includes the use of a vacuum generator to accelerate the evacuation of the manifold.

Representative patents illustrating delivery processes of high purity gases employing impurity removal methods are as follows:

U.S. Pat. No. 5,137,047 discloses a system for delivery of a reactive gas for semiconductor applications comprising a pigtail for connecting the supply source with the point of use and a purge gas subsystem. The pigtail has an orifice said to allow the required flow of process gas while eliminating reverse diffusion of atmospheric gases. The purge gas line is connected to the pigtail so that when a vacuum is produced in the delivery circuit, a purge gas can be admitted to remove moisture and impurities. A venturi is used to create a vacuum during the purge cycle.

U.S. Pat. No. 5,359,787 discloses chemical transfer apparatus for delivering corrosive chemicals from a tube trailer while reducing moisture and entrainment of particulates. A purge system employing a vacuum source is used. Argon is used as a purge gas in order to avoid entrainment of atmospheric air and then it is vented.

U.S. Pat. No. 5,749,389 discloses apparatus for delivering high purity gas from gas cylinders to a point of use in semiconductor operations. An improved system to the prior art cross flow, deep purge and vacuum generator methods for purging is shown and the improved system comprises: a process connection through which ultra-high purity gas is in communication to a process; a first pigtail conduit in selective flow communication with a high purity gas source; a second pigtail conduit in selective flow communication with said process connection; a source of vacuum and a connection for selectively placing said vacuum source in communication with said first pigtail; and an ultra-high purity process gas source. The preferred embodiment further comprises a block valve assembly comprising an inlet port in flow communication with said high-purity process gas source, a first outlet port in selective flow communication with said purge gas supply through connection with said first pigtail, and a second outlet port in selective flow communication with said process connection through connection with said second pigtail. A pigtail bleed is used to prevent atmospheric air from causing contamination.

U.S. Pat. No. 5,398,712 discloses a device for use in the removal of contaminants from a gas cylinder valve assembly using vacuum and purge techniques. The device uses a purge gas inlet having a first orifice cross-section, a purge gas outlet having a second orifice cross-section and a third orifice connection for the first and second orifices having reduced cross-section to the first ad second orifice. A fourth orifice is connected to the gas cylinder and is joined to the second orifice. As purge gas is passed through the first orifice to the outlet, a vacuum is created in the fourth orifice connected to the gas cylinder and such vacuum facilitates removal of contaminant gas.

BRIEF SUMMARY OF THE INVENTION

The present invention provides an improved gas transfer apparatus designed for enhanced purging of a pigtail employed in transferring gas from a gas supply source to a delivery point of use, e.g., a gas manifold and a process for effecting such purging of the pigtail. The improvement in the apparatus resides in an integrated system of components comprising:

a vessel containing a gas source;

a pigtail conduit a hollow, generally cylindrical shape, having an initial end and a terminal end adapted for delivery attachment to a point of use;

a surge chamber having a first end, a body and a second end, said first end in communication with the initial end of said pigtail conduit, said body section of said surge chamber having a body diameter larger than the diameter of said pigtail conduit and a second end in communication with said vessel containing said gas source;

optionally, a vacuum source in fluid communication with said pigtail conduit; and, a purge gas source permitting delivery of a purge gas to said pigtail conduit whereby during an alternating cycle of pressurization of said pigtail with said purge gas and depressurization of said pigtail conduit, optionally with application of vacuum, contaminating gases and impurities are removed from within the pigtail conduit.

Significant advantages can be achieved by the practice of the improved process and apparatus of the invention and these include:

an ability to improve the purge efficiency in long gas transfer conduits or pigtails to achieve safety and lower impurity levels in gas transfer apparatus, i.e., pigtail;

an ability to reduce purge gas consumption due to the use of fewer purge cycles; and, an ability to obtain higher purity product gas through reduced contaminant level in the pigtail.

DETAILED DESCRIPTION OF THE INVENTION

The practice of purging conduits comprised of piping, valves and the like employed in the delivery of a gas from a gas source to a delivery site typically the point of use, e.g., a gas manifold, during change-out of the gas source is common in many gas applications. One example of this practice is the purging of the connection of a gas transfer conduit, commonly called a pigtail, between a gas source container and a gas control manifold in semiconductor manufacture. Before initiating service of a new gas source, the valve allowing for delivery of the now empty gas source is closed and the pigtail purged to remove residual gas in the pigtail. Purging of the pigtail is effected by pressurizing the pigtail with a purge gas and then removing the now contaminated purge gas by de-pressurizing the pigtail. Multiple purge cycles are employed to eliminate any remaining gas hazard. With the reconnection of the pigtail to a new gas source, purging of the pigtail is effected to again to ensure purity of the gas to the point of use consumption point. Because of increased delivery demands and inefficiencies in long gas transfer pigtails and increased diameters of such pigtails, it is important that the number of purge cycles to achieve safety and clean operation be reduced. In addition, it is important to achieve very low levels of contaminates and impurities in the pigtail conduit with fewer purge cycles.

In the present invention, gas supply sources may consist of a gas cylinder, a tube trailer, or other delivery vessel such as those employed in the delivery of gases and chemicals for the electronics and analytical industries. Common gases for the electronics industry include hydrogen halides such as hydrogen chloride; nitrogen trifluoride, arsine, phosphine, diborane, and the like. Change-out of these respective gas sources requires that safety and impurity standards be met.

Figure 1:
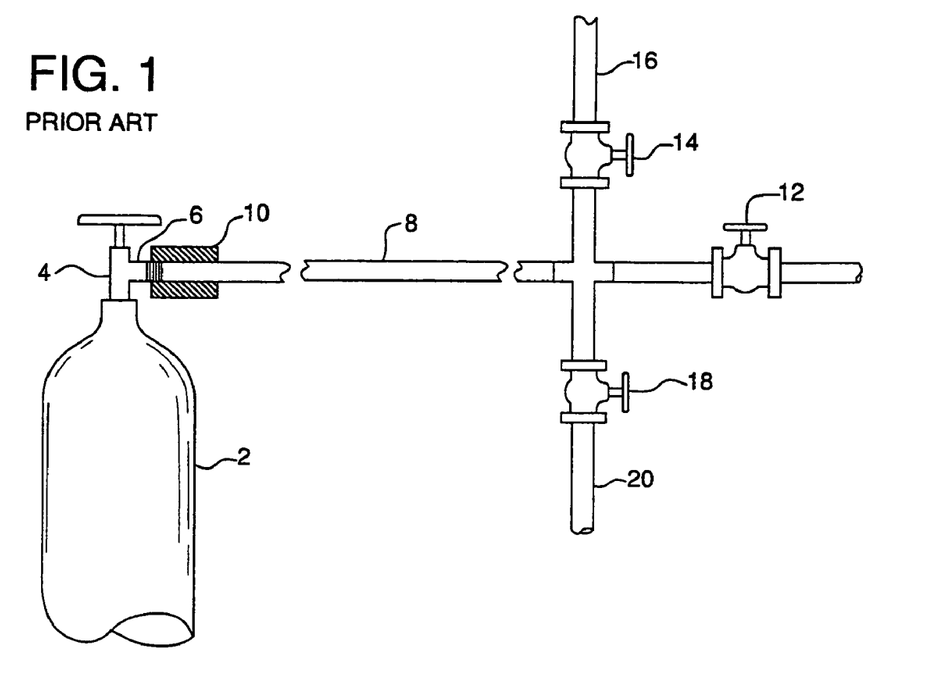
FIG. 1 is a view of a prior art pigtail connection connecting a gas source with a point of use, e.g., a manifold with a connection to an associated vacuum source and purge gas source.

To facilitate an understanding of the prior art and its relationship to this invention, reference is made to FIG. 1. (Components of the gas supply apparatus in FIGS. 2-4, which are similar to those components in the system of FIG. 1 have common numbers.) Gas cylinder 2 represents a gas source for supplying gas to a point of use which includes associated cylinder valve 4 for controlling flow of gas from said gas cylinder 2 to delivery connection 6. A pigtail conduit 8 is connected to delivery connection 6 via connector 10 thus providing fluid communication from the gas cylinder 2 through said pigtail conduit 8 to a delivery site or the point of use, typically a gas manifold (not shown).

A pigtail commonly is comprised of a series of valves and piping to permit not only delivery of the gas from a source to a point of use but to permit purging. In the embodiment of FIG. 1, pigtail 8 terminates at its initial end in connector 10. At or near its terminal end, valve 12 is used to control flow to the point of use and to close the pigtail from gas flow in a direction from the terminal end of the pigtail to its initial end.

Pigtail 8 incorporates mechanism for purging residual gases and contaminates remaining within the conduit during changeover of a gas supply unit. In the purging of pigtail 8, valve 12 is closed and valve 14 opened allowing for the introduction of a purge gas through line 16. Purge gas line 16 is located close to the terminal end of pigtail 8 as in cross-purge process so that minimal space for accumulation of gas between the purge point and delivery via valve 12. The purge gas is typically an inert gas, such as nitrogen or argon although other gases inert to the process and non hazardous to plant staff, may be used.

Pigtail 8 is pressurized to an elevated pressure typically from 3 to 10 atmospheres within from about 3 to 15 seconds. Preferably pressurization is carried out such that the pressure in pigtail 8 is from about 5 to 8 atmospheres and the pressurization being achieved in about 5 to 7 seconds. Once pigtail 8 is pressurized, the purge gas becomes diluted via diffusion with remaining gases. At this point, valve 14 is closed and valve 18 is opened permitting evacuation of pigtail 8 via line 20. Line 20 is generally connected to a vacuum source (not shown) and vented to an acceptable outlet. If line 20 is connected to a vacuum pump, the pressure in pigtail 8 preferably is reduced to a pressure of from about 0.1 to 1 atmosphere, typically from 0.3 to 0.8 atmospheres. A reduced pressure in pigtail 8 may be maintained for a preselected time, typically from 5 to 30 seconds. Once, gases are removed from pigtail 8, valve 18 is closed and purge valve 14 opened allowing for introduction of purge gas. The cycle is repeated until the desired level of contaminant removal in pigtail 8 is reached.

In the prior art embodiment of FIG. 1, the pigtail is a straight though connection to gas cylinder 2. In contrast to the prior art, it has been found that the use of a surge chamber within the pigtail enhances the ability to reduce contaminant levels therein.

Figure 2:
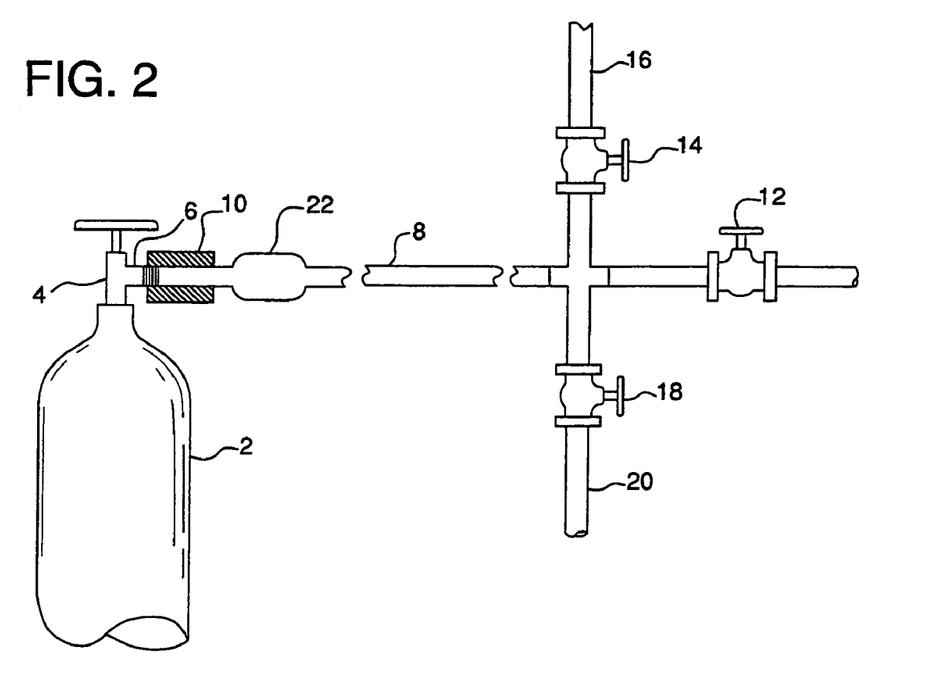
FIG. 2 is a view of a pigtail connection connecting a gas source with a point of use, as in FIG. 1 but employing a cylindrical shaped surge chamber in axial alignment with gas flow in the pigtail, said surge chamber separated from the gas source by a short nipple.

The FIG. 2 embodiment is similar to that of FIG. 1 except a cylindrical shaped surge chamber 22 is positioned in axial alignment with gas flow in pigtail 8. The surge chamber 22 is separated from connector 10 by a short nipple section. Typically the space between the surge chamber 22 and connector 10 is kept as small as possible and thus may be from about ½ inch to 2 inches for piping of from about ¼ to ¾ inches in diameter.

Figure 3:
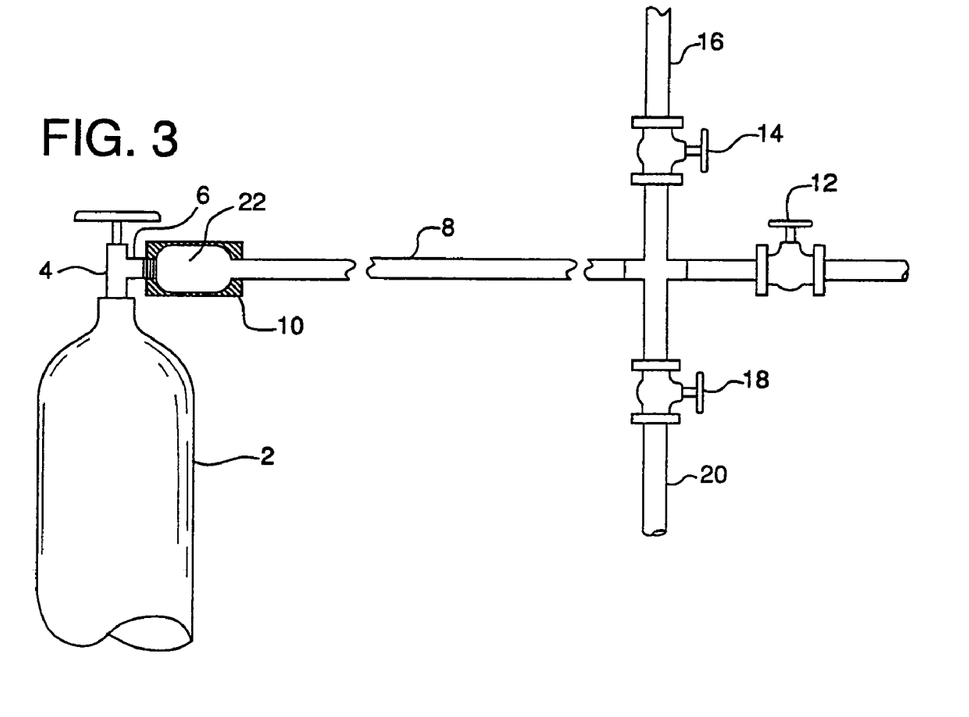
FIG. 3 is a view of a pigtail connection connecting a gas source with a point of use, as in FIG. 1 but employing a cylindrical shaped surge chamber in axial alignment with gas flow in the pigtail, where the surge chamber is embodied in the coupling of the pigtail to the gas source.

The FIG. 3 embodiment is a view similar to that of FIG. 2 except that connector 10 is enlarged to house surge chamber 22 within. With surge chamber 22 it is possible to minimize the dead space between the surge chamber and connection to gas cylinder 2 and delivery connection 6.

Figure 4:
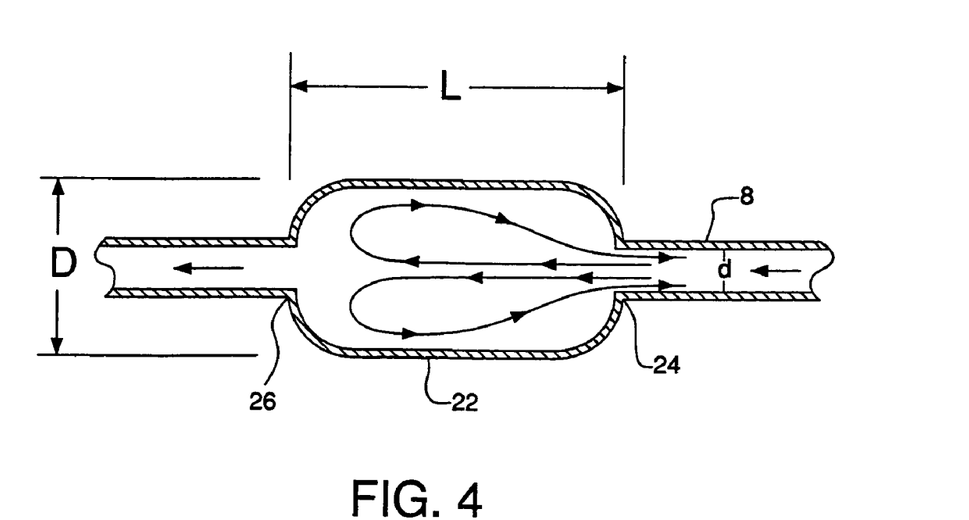
FIG. 4 is a view of a representative surge chamber for use in the purging process illustrating gas flow and the believed gas flow characteristics within the surge chamber that accounts for lower impurity levels and fewer purge cycles in a purging process along with Length (L) diameter (D) and diameter (d) of the pigtail conduit.

The surge chamber is a key to reducing the purge cycles in purge gas processes associated with gas delivery such as in the electronics industry. As represented in FIG. 4 surge 22 comprises an inlet 24 leading to a generally cylindrical body section having a diameter (D) which is larger than the diameter (d) of the pigtail tubing leading to surge chamber 22. Typically, the diameter (D) of the surge chamber is from 1.1 to 20, preferably from 1.2 to 10, times that of the diameter (d) of pigtail 8. If the diameter (D) of the body section of surge chamber 22 is too small in relationship to the diameter (d) of the pigtail tubing leading to the surge chamber, there generally insufficient mixing of the purge gas with the process gas or contaminants within the pigtail to facilitate efficient removal of the pigtail. If the ratio is large, there can be associated costs with excessive use of purge gas and loss of product gas, even though efficient removal of contaminates may be achieved.

The outlet 26 as shown in FIG. 4 is of the same diameter (d) as that of the pigtail tubing leading to the inlet 24 of surge chamber 22. However, the diameter of the outlet of surge chamber 22 need not be the same as the diameter of that of the pigtail tubing leading to surge chamber 22 but in fact the diameter of the surge chamber 22 may be the same as, equal to, or greater than the diameter (D) of the body section of surge chamber 22.

FIG. 4 shows a surge chamber having a length L and a body section diameter (D). The length of surge chamber is in reference to the flow of gas, i.e., the longitudinal axis of surge chamber 22 is parallel to the flow of gas as shown in FIGS. 1-3. The ratio of the length (L) of surge chamber 22 to the diameter D should be at least 0.8:1 and preferably at least 1:1. Although the ratio (L/D) may be very large, as will be illustrated in the examples herein, ratios in excess of about 10:1 often lead to excessive use of purge gas without achieving justifiable results. L/D ratios of less than 1:1 can offer an improvement over the conventional prior art embodiment as shown in FIG. 1 but higher L/D ratios are preferred.

The surge chamber can take many shapes however cylindrical shapes are preferred. Surge chambers should be rounded at inlet 24 and outlet 26 as shown to eliminate or at least reduce eddy currents in the direction of flow as the pigtail is pressurized with a purge gas and as it is withdrawn from the pigtail.

The following examples are provided to illustrate various embodiments of the apparatus and processes and are not intended to restrict the scope thereof. Unless otherwise specified, purge gases are introduced in a direction from the point of use toward the gas source to pressurize the pigtail and removal of purge gas is in the direction of the gas source to the point of use.

EXAMPLE 1

Evaluation of Surge Chamber in Reducing Purge Cycles and Impurity Level

Figure 5:
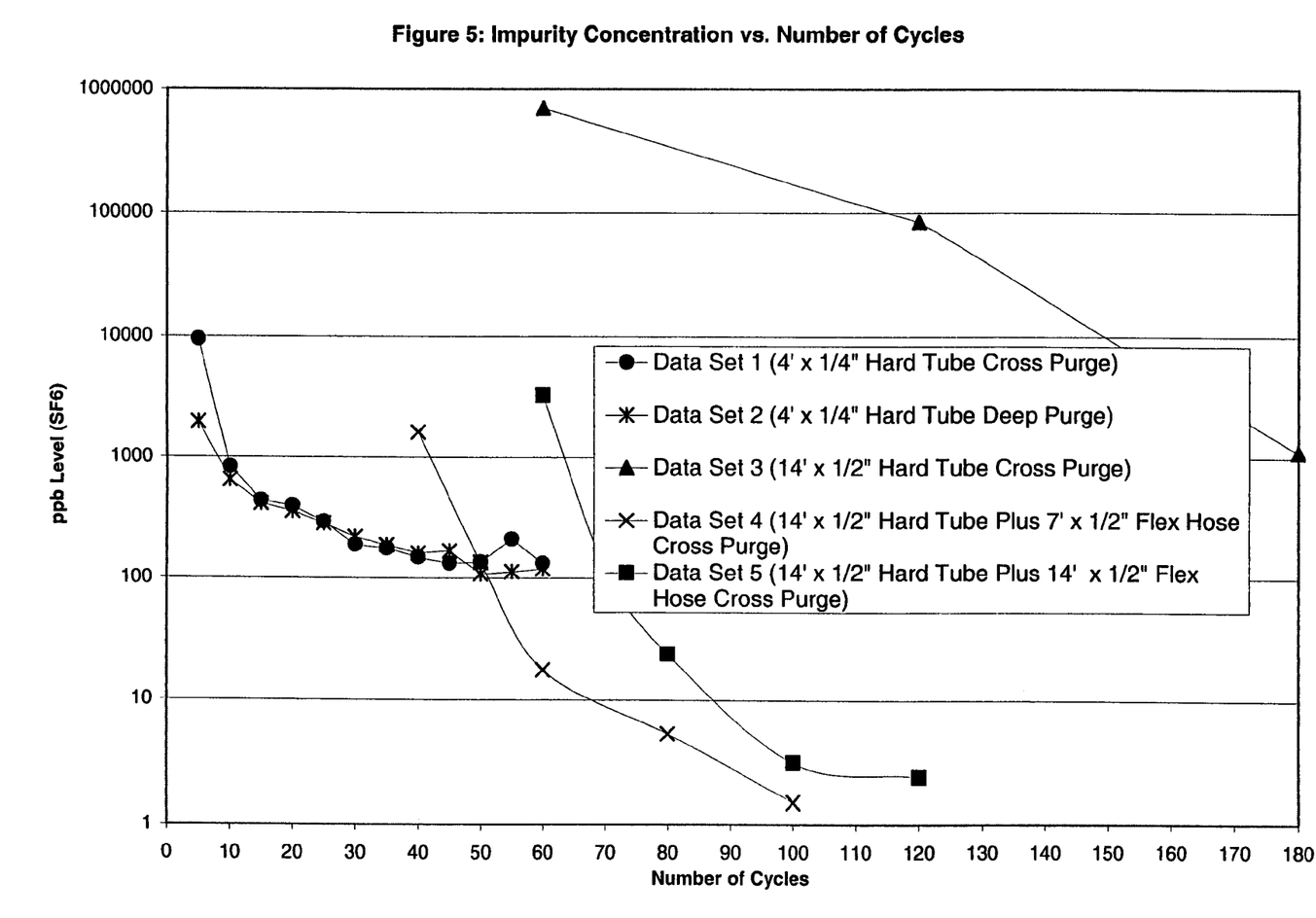
FIG. 5 is a plot of impurity level in pigtail conduits of differing lengths and diameters as well as surge chambers of different lengths verses the number of purge cycles.

A series of tests was carried out to determine the comparative effectiveness of surge chambers in terms of reducing the number of purge cycles to achieve preselected gaseous impurity levels in the pigtail conduit during change-out of an $SF_6$ gas supply cylinder. The initial contamination level of $SF_6$ impurities in the nitrogen purge gas was in excess of 100,000 ppb. The pigtail was pressurized with nitrogen to a pressure of 80 to 100 psig in a period of about 5 seconds and then evacuated to a pressure below atmospheric by applying vacuum. FIG. 5 is a plot of the results.

Run 1. Data Set 1, as represent in the graph, shows the results of a control purge procedure employing a prior art cross-purge procedure. It shows the impurity level of $SF_6$ in a ¼ inch pigtail of 4 feet in length and having an external diameter of 0.25 inches, a wall thickness of 0.035 inches and thus and internal diameter of 0.180 inches as a function of the number of purge cycles. The initial $SF_6$ level is about 10,000 ppb and at 60 cycles, a value of 100 ppb is achieved. The plot shows that minimal removal of $SF_6$ can be achieved after about 60 cycles.

Run 2. Data Set 2, as represented in the graph, shows the results of a control purge procedure employing a prior art deep purge method showing the impurity level of $SF_6$ verses the number of cycles. The 4 foot pigtail is identical to the one employed in Run 1. The results show that at about 10 cycles, the level of $SF_6$ is reduced to about 2,000 ppb and at 60 cycles, a value of 10 ppb is achieved. The plot shows that minimal removal of $SF_6$ can be achieved after about 60 cycles and the results becomes similar to that of the cross purge procedure in Run 1.

Run 3. Data Set 3, as represented in the graph, shows the result of a control purge procedure employing a cross purge. This run is similar to that resulting in Data set 1 except for the increased diameter and length of the pigtail. The pigtail consists of 14 feet of ½ inch hard tube having an external diameter of ½ inch and a wall thickness of 0.045 inches thus leaving an internal diameter of 0.410 inches. Data set 3 shows that at about 50 cycles the concentration of $SF_6$ is about 98,000 ppb and at about 120 cycles the level is about 10,000 ppb. (The initial concentrations of $SF_6$ in all runs, including Runs 1 and 2 are about the same.)

Run 4. Data Set 4, as represented in the graph, provides a general comparison to the cross purge method of Run 3. However, the pigtail here consists of the ½ inch pigtail of 14 feet employed in Run 3, coupled to a ½ inch flex tube having a length of 7 feet, an external diameter of ⅞ inch and an internal diameter of ½ inch. The ½ inch flex tube was connected to the gas source and thus inserted between the ½ inch pigtail and the gas source. It was intended to act as a surge chamber in relation to the ½ inch diameter pigtail. The ratio of the internal diameter (D) of the flex hose to that of the internal diameter of the 14 foot pigtail (d) is 1.22:1 and the ratio of the length (L) of the flex tube to its diameter (D) is 168:1. Purge gas is passed through the 14 foot pigtail and then through the 7 feet of flex hose and then evacuated.

In contrast to the prior art methods of Runs 1-3, even considering the additional length of the pigtail associated with the length of the surge chamber, the results show that at about 40 cycles, the level of $SF_6$ impurity was about 2,000 ppb and well below that level reported with the ½ inch hard tube of Run 3. Although the impurity level of the gas conduit at about 40 cycles was above both the cross-purge and deep purge, as illustrated in Runs 1 and 2, the results show with continued purging that the $SF_6$ impurity level can be reduced to about 20 ppb at 60 cycles. The results also show the level can be reduced even more with continued purging and that a level of 5 ppb can be reached at about 100 cycles. This level is much lower than could have been expected by the prior art cross-purge and deep purge pf Runs 1 and 2. The data also show that the length of the surge chamber in relation to its diameter is not critical.

Run 5. Data Set 5 shows the efficiency of a purge method where the gas conduit consisted of the 14 feet of ½ pigtail, 14 feet of ½ inch flex tube, the flex tube representing the surge chamber and being connected directly to the gas source as in FIG. 3. The ratio of the 14 feet of hard tube diameter (D) to that of initial of diameter of the ½ inch pigtail (d) is 1.22:1 and the ratio of L/D increases to 336:1.

That data show that in Data Set 5 similar impurity levels to those achieved in Run 4 can be achieved and such impurity levels are substantially lower than achieved in the procedures of Runs 1-3. Run 5 does show that the extra length of the pigtail vis-à-vis Run 4 does impose a performance price in that it requires more purge cycles to be carried out to achieve a similar contaminant or impurity level.

EXAMPLE 2

Evaluation of Surge Chamber in Moisture Removal From Pigtail

A series of tests was run to determine the effectiveness of a surge chamber in facilitating the removal of moisture from a ½ inch hard tube pigtail conduit employed in gas transfer apparatus. In this test procedure, each pigtail was saturated with moisture, moisture being selected because of the difficulty or removing moisture from pigtail conduits. 10 purge cycles were effected. More specifically, each pigtail was pressurized with nitrogen to a pressure of from 80 to 100 psig and then evacuated to a pressure of below atmospheric. After evacuation of the pigtail as the last step of the 10 cycle purge, a purge gas was passed through each pigtail and the moisture level in the purge gas plotted as a function of time. The area under the curve represents the amount of moisture remaining in the pigtail after 10 cycles of purging. It follows from the graph on FIG. 6, that the procedure having the minimum area under the curve were more effective in moisture removal than were the other methods.

Figure 6:
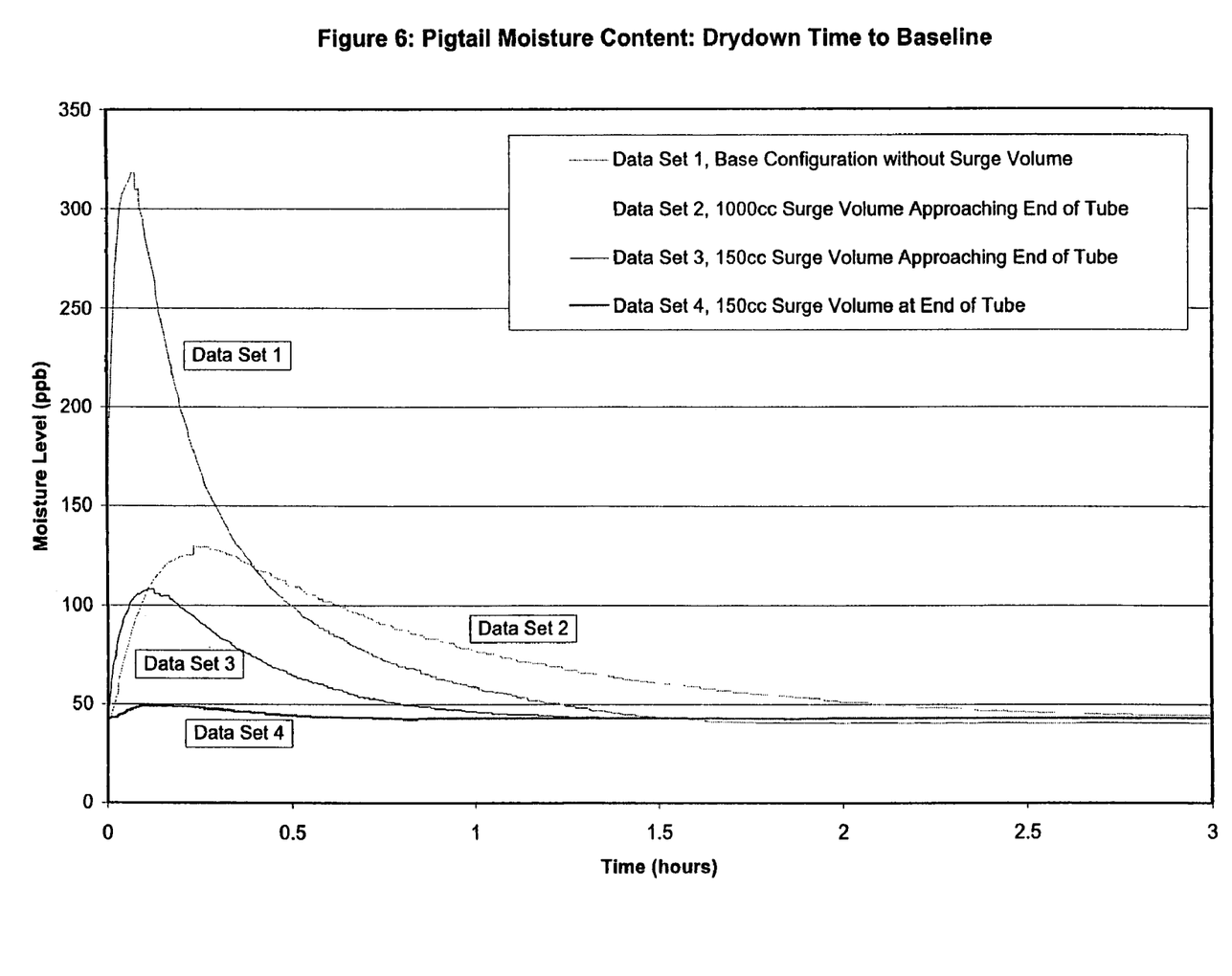
FIG. 6 is a plot of moisture level in a purge gas verses purge time following 10 cycles of purge in a pigtail incorporating a surge chamber.

Run 1. Data Set 1 is a control baseline plot of the moisture level as a function of time where there is no surge chamber. The pigtail conduit consisted of 15 feet of one-half inch of hard tube, as in Data Set 3 of Run 3 in Example 1, FIG. 5.

Run 2. Data Set 2 is a plot of the moisture level as a function of time wherein a 1000 cc surge chamber of the type in FIG. 2 is incorporated near the terminal end of the pigtail, i.e., it is separated from the capped end by a short nipple, i.e., between 1-2 inches simulating the connection to a gas supply source. The surge chamber has a length of 10.9 inches, an internal diameter of 3.32 inches, with a wall thickness of 0.18 inches (D/d is 6.6:1 and the L/D is 3.2:1). At each end the surge chamber is reduced, one end to engage the ½ inch diameter hard tube pigtail conduit and the end to engage the nipple leading to the capped end.

Run 3. Data Set 3 is a plot of the moisture level as a function of time wherein a surge chamber having a volume of 150 cc was inserted at a point approaching the end of the pigtail, i.e., separated from the gas source by a nipple as in Run 2. The 150 cc surge chamber, as generally represented in FIG. 2, has a opening size of ½ inch leading to the body section which had an external diameter of 2 inches, a wall thickness of 0.093 inches, thus leaving an interior diameter of 1.90 inches, (D/d is 3.8:1) and a cylinder body length of 2⅝ inches (L/D is 1.3:1). At one end it engages the ½ inch pigtail conduit and at the other end it engages a short nipple as in Run 2. The basic difference in this Run 3 from Run 2 is in the size of the surge chamber.

Run 4. Data Set 4 is a plot of the moisture level as a function of time wherein the 150 cc surge chamber employed in Data Set 3 is connected directly to the capped end, as generally represented by FIG. 3.

As can be seen from the plots, the area under the curves for the purge methods employing a surge chamber in communication with the gas supply source was significantly less than (a) when purging was done without a surge chamber and (b) most preferably when a small surge chamber was placed at the terminal end of the pigtail, i.e., as would be the case when connected directly to the gas supply source. The data shows that the surge chamber does not have to be large, particularly as the one used in generating Data Set 2, in that the smaller 150 cc surge chamber proved slightly more efficient. The results are particularly striking when the surge chamber is directly connected to the end of the pigtail and simulating direct connection to the gas source.

It should also be noted that the base line plot, i.e., Data Set 1 of Example 2 corroborates the results of Example 1 Data Sets 1 and 2. In the absence of a surge chamber, purging requires more cycles to achieve a similar level of impurity reduction. These results also show that a greater amount of moisture can be removed in 10 cycles when the surge chamber is used and it connected directly to the gas source than slightly separated, .e.g. by a short nipple of from ½ to 2 in inches.

Summarizing from the examples, it has been found that the use of a surge chamber at the terminal end of a pigtail associated with gas supply apparatus facilitates the removal of product gas and impurities trapped within the pigtail on changeover of the gas supply. More effective dilution of residual contaminants in the pigtail conduit is achieved with fewer cycles of purge/vacuum than in those instances where a surge chamber is not employed.

Although, not intending to be bound by theory, it is thought as the pigtail becomes pressurized with inert gas, mixing is created in the expanded body section of the surge chamber 14 as indicted by the circular arrows shown in FIG. 4. The creation of turbulence near the gas cylinder enhances the diffusion effect of gases trapped between the connection point of gas cylinder 2. With greater diffusion of the purge gas created by the use of a surge chamber, impurity removal is facilitated on evacuation of the purge gas in the pigtail. It is generally believed the L/D ratio should be at least 0.8:1 and preferably at least 1:1. As the ratio of L/D increases, as shown in Example 1 it generally increases the number of purge cycles to achieve similar purity levels. It is also believed that the ratio of D/d should be at least 1.2 as shown in Example 2 and not more than about 10:1.

The invention claimed is:

1. A system for transferring gas from a gas supply vessel to a delivery point of use which comprises:
   a vessel containing a gas source;
   a pigtail conduit having an initial end and a terminal end adapted for delivery of gas to a point of use;
   a surge chamber having a first end, a body section and a second end, said first end in communication with the initial end of said pigtail conduit, said body section of said surge chamber having a cross-section larger than the cross-section of said pigtail conduit and a second end in communication with said vessel containing said gas source;
   a purge gas source for delivery of a purge gas in the direction from the terminal end toward the vessel containing a gas source within said pigtail conduit during an alternating cycle of pressurization of said pigtail conduit with said purge gas; and,
   a depressurization source within said pigtail conduit allowing for removal of impurity gases retained within said pigtail conduit.

2. The system in accordance with claim 1 wherein the surge chamber is adjacent the vessel containing the gas source.

3. The system in accordance with claim 1 wherein the surge chamber is directly connected to said vessel containing said gas source.

4. The system in accordance with claim 3 wherein a vacuum source is employed to assist in depressurization of said pigtail conduit.

5. The system of claim 3 wherein the ratio of the diameter of body section of the surge chamber (D) with respect to the diameter (d) of said pigtail of from 1.2 to 10:1.

6. The system of claim 5 wherein the surge chamber is in the form of a tube.

7. The system of claim 6 wherein the surge chamber is a cylindrical.

8. The system of claim 7 wherein the ratio of the length of the surge chamber (L) to the diameter (D) of the surge chamber is at least 1:1.

9. The system of claim 7 wherein the ratio of the length of the surge chamber (L) to the diameter (D) of the surge chamber is from 0.8 to 10:1.

10. The system of claim 7 wherein the pigtail has a diameter (d) of from ¼ to ½ inches.

11. In a process for purging a pigtail conduit employed for transferring gas from a vessel containing a gas source to a delivery point of use to remove impurities therefrom, which comprises the steps of alternately pressurizing said pigtail conduit with a purge gas and removing said purge gas contaminated with gaseous impurities, the improvement which comprises:
    providing a surge chamber between the vessel containing a gas source and the pigtail conduit employed for transferring gas from said vessel to a delivery point, said surge chamber having a diameter (D) larger than the diameter (d) of said gas conduit;
    passing said purge gas through said pigtail conduit and said surge chamber in a direction from said delivery point of use to said vessel; and,
    removing said purge gas containing gaseous impurities by withdrawing gas in a direction from said vessel containing a gas source to said delivery point of use.

12. The process of claim 11 wherein the surge chamber is directly connected to said vessel containing said gas source.

13. The process of claim 11 wherein vacuum is applied to assist in removing purge gas contaminated with impurities from said pigtail conduit.

14. The process of claim 13 wherein the ratio of the diameter (D) of the body section of the surge chamber with respect to the diameter (d) of said pigtail of from 1.2 to 10:1.

15. The process of claim 14 wherein the surge chamber is cylindrical.

16. The process of claim 14 wherein the diameter of the pigtail conduit (d) is from ¼ to ½ inches.

17. The process of claim 16 wherein the ratio of the diameter of the surge chamber (d) to that of the diameter (d) of the pigtail is from about 1.2 to 10 and the ratio of the length (L) to that of the diameter (D) is at least 1:1.

* * * * *

UNITED STATES PATENT AND TRADEMARK OFFICE
CERTIFICATE OF CORRECTION

| | |
|---|---|
| PATENT NO. | : 7,264,013 B2 |
| APPLICATION NO. | : 11/128515 |
| DATED | : September 4, 2007 |
| INVENTOR(S) | : Joseph R. Barker et al. |

Page 1 of 1

It is certified that error appears in the above-identified patent and that said Letters Patent is hereby corrected as shown below:

Title Page, Item (75) Inventors

Delete "Andrew Joseph Toth" and insert -- Andrew James Toth --

Signed and Sealed this

Twentieth Day of November, 2007

JON W. DUDAS
*Director of the United States Patent and Trademark Office*